INVENTOR.
HAROLD MOREINES

INVENTOR.
HAROLD MOREINES

United States Patent Office 3,475,743
Patented Oct. 28, 1969

3,475,743
REDUNDANT INTEGRATOR SYSTEMS
Harold Moreines, Springfield, N.J., assignor to The
Bendix Corporation, a corporation of Delaware
Filed Nov. 25, 1966, Ser. No. 596,994
Int. Cl. G08b 1/08; G06g 7/28; H03k 19/00; G05f 1/10
U.S. Cl. 340—213                                10 Claims

ABSTRACT OF THE DISCLOSURE

A redundant integrator system including means to slave the outputs of a plurality of integrators to the output of a selected integrator so as to maintain during normal operation of the redundant system all of the individual integrator outputs in close correspondence with the selected integrator output so as to preclude output differences from exceeding monitor threshold levels and thereby avoid the actuation of nuisance alarms.

CROSS-REFERENCES TO RELATED APPLICATIONS

In one form of the redundant system of the present invention, the integrator outputs may be monitors two-by-two by cross channel monitors, as disclosed in a copending U.S. application Ser. No. 318,050, filed Oct. 22, 1963 by Robert L. Worthington and Frank J. Thomas, now U.S. Patent No. 3,289,193, granted Nov. 29, 1966; and in another form of the present invention, the integrator outputs may be monitored by a cross voter monitor system, as disclosed in a copending U.S. application Ser. No. 317,970, filed Oct. 22, 1963 by Harold Moreines. The redundant system of the present invention also may include voter devices of a type disclosed in a copending U.S. application Ser. No. 314,397, filed Oct. 7, 1963 by Harold Moreines, now U.S. Patent No. 3,305,735, granted Feb. 21, 1967, and threshold level detectors such as disclosed and claimed in a copending U.S. application Ser. No. 330,819, filed Dec. 16, 1963 by Harold Moreines, now U.S. Patent No. 3,311,837, granted Mar. 28, 1967. All of said applications and patents have been assigned to The Bendix Corporation, assignee of the present invention.

BACKGROUND OF THE INVENTION

Field of the invention

The present invention pertains broadly to the field of redundant computing and control systems and to the provision in redundant integrator monitored systems of improved means for preventing nuisance alarms due merely to drift, offset, or gain variations normally associated with practical integrators in the normal operation thereof.

Description of the prior art

Heretofore, fail-operative control and computing systems have been constructed using (1) triple redundancy with on-line majority voting to select proper signals and (2) off-line monitoring to detect and/or display failure status of the voted equipment as described in the aforenoted U.S. application Ser. No. 317,970 and U.S. Patents 3,305,735 and 3,289,193.

Many systems require integration of signals with respect to time within the computing or control equipment. Heretofore it has been impossible to incorporate integrators into redundant channels, because tracking problems have been found to arise due to the slightest mismatch among integrator gains, offsets, or input signals. Although these variations may be negligible on an absolute scale, when they are integrated over a period of time that is short relative to a normal operating cycle, the integrators tend to develop large differences among their output signals. In such redundant systems this would cause monitor alarms even if all components within the system were operating properly.

SUMMARY OF THE INVENTION

In order to avoid such nuisance alarms, it is within the contemplation of the present invention to provide a slaving means that, in effect, selects one integrator output as the system response and forces the other integrators to maintain their outputs within close correspondence to the selected output so as to make possible the use of such integrators in redundant systems.

Another object within the contemplation of the present invention is to provide means whereby the output differences may be kept appreciably below the monitor threshold levels, thereby precluding nuisance alarms due to integrator anomalies.

Another object of the invention is to provide in a redundant integrator system means whereby the outputs of a plurality of integrators may be slaved to the output of a selected integrator, thereby maintaining all of the individual integrator outputs in close correspondence with the selected integrator output.

Another object of the invention is to provide means in said redundant integrator system for precluding output differences from exceeding monitor threshold levels thereby avoiding the actuation of nuisance alarms.

Another object of the invention is to provide in said redundant integrator system three redundant channels each comprised of an integrator connected to a voting circuit which is also responsive to the integrator outputs in the remaining channels, together with a slaving circuit responsive to the integrator and voting circuit outputs of each channel and arranged in a feedback relationship so as to provide a slaving signal to a summing junction for summation with the normal input prior to application as the integrator input.

Another object of the invention is to provide in the aforesaid slaving circuit a differential amplifier which subtracts the voting circuit output from the integrator output and feeds the differential obtained to a threshold level detector which provides the above mentioned slaving signal upon the difference signal exceeding a predetermined level.

Another object of the invention is to provide in said redundant integrator system differential means for monitoring integrator outputs and thereby selecting one integrator output to which the remaining channel signals are to be slaved.

Another object of the invention is to provide in a redundant integrator system a plurality of signal channels, integrators and voter devices in which each signal channel includes a slaving network responsive to the integrator and voter outputs of each channel to provide a slaving signal upon the difference in said outputs exceeding a predetermined level and applying the slaving signal as a feedback for summation with the normal input to the integrator so as to avoid nuisance alarms by causing during normal operation the selection of one integrator output as the system response and force the other integrators to maintain their outputs within close correspondence to the selected output during such normal operation.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
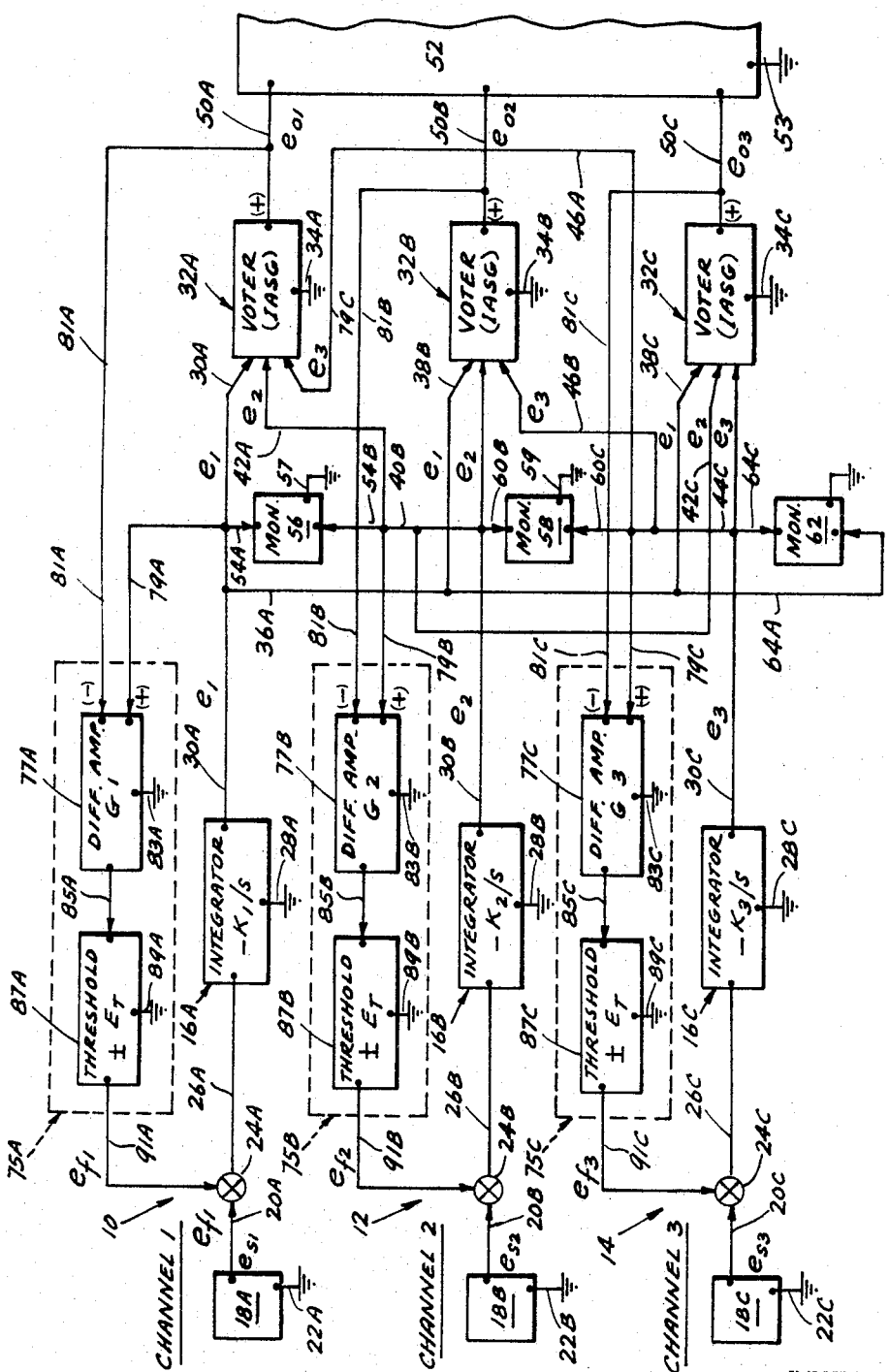
FIGURE 1 is a block diagram of a triple redundant integrator system embodying the present invention and monitored two-by-two by cross channeled monitors.

Referring to the drawing of FIGURE 1, the cross channel monitoring system may be of a type disclosed and claimed in the aforenoted copending U.S. application Ser. No. 318,050, filed Oct. 22, 1963, by Robert L. Worthington and Frank J. Thomas, now U.S. Patent No. 3,289,193, granted Nov. 22, 1966, and the redundant system may include channels 10, 12 and 14 embodying redundant equipment such as integrator networks of identical type and indicated generally by the numerals 16A, 16B and 16C.

Suitable alternating current or direct current signal sources 18A, 18B and 18C may be provided in the respective channels 10, 12 and 14. The signal source 18A has a signal output line 20A and a grounded output line 22A across which there may be applied signal $e_{s1}$. The line 20A is connected through a suitable summation device 24A to an electrical conductor 26A leading to an input terminal of the integrator network 16A which may be of a conventional type having a grounded input output terminal 28A.

The summation device 24A serves to algebraically sum the input signal $e_{s1}$ applied through the line 20A with a feedback signal $e_{f1}$ applied through the line 91A, as hereinafter explained, so that the algebraic sum of the signals $e_{s1}$ and $e_{f1}$ is effectively applied as a summation signal to the conductor 26A leading to the input of the integrator network 16A.

Further, the integrator network 16A has an output line 30A leading to one of three inputs of an intermediate amplitude selective gate or voter device 32A having a grounded input-output terminal 34A. The voter device 32A may be of a type disclosed in the aforenoted copending U.S. application Ser. No. 314,397, filed Oct. 7, 1963, by Harold Moreines, now U.S. Patent No. 3,305,735, granted Feb. 21, 1967. There is applied then through the output line 30A leading to the input of the voter device 32A an electrical signal $e_1$.

The respective channels 12 and 14 have like parts to those heretofore described with reference to channel 10 in which the like parts are indicated in FIGURE 1 by corresponding numerals to which there have been added the suffixes B and C, respectively. Further applied to the output conductor 30A leading from the integrator network 16A to one of the three inputs of the voter device 32A is an electrical signal $e_1$ which is also applied through a conductor 36A leading from the conductor 30A and thereby through conductors 38B and 38C to one of the three inputs of the voter devices 32B and 32C, respectively, in the channels 12 and 14.

Further applied through the output conductor 30B leading from the output of the integrator network 16B to a second input terminal of the voter device 32B is an electrical signal $e_2$. The electrical signal $e_2$ is also applied through an electrical conductor 40B leading from the conductor 30B and through electrical conductors 42A and 42C to a second input terminal of each of the voter devices 32A and 32C.

Also applied across the output conductor 30C leading from the integrator network 16C to a third input terminal of the voter device 32C is an electrical signal $e_3$. The electrical signal $e_3$ is applied through an electrical conductor 44C leading from the conductor 30C and through conductors 46A and 46B to a third input terminal of each of the voter devices 32A and 32B.

The intermediate amplitude selective gates or voter devices 32A, 32B and 32C are of the type heretofore described in the aforenoted U.S. Patent No. 3,305,735, granted Feb. 21, 1967, and are so arranged as to apply through output conductors 50A, 50B and 50C, respectively, leading therefrom an electrical signal $e_{01}$, $e_{02}$ and $e_{03}$ of an amplitude corresponding to that of the signal $e_1$, $e_2$ or $e_3$ having an intermediate amplitude value, as heretofore described in the aforenoted U.S. Patent No. 3,305,735, granted Feb. 21, 1967. These intermediate amplitude signals $e_{01}$, $e_{02}$ and $e_{03}$ are then applied through the output lines 50A, 50B and 50C to the input of a suitable device or devices 52 to be operated thereby and including a grounded input conductor 53.

Further connected across the output line 30A and 30B by conductors 54A and 54B is a cross channel monitor 56 which has a grounded input conductor 57 and which may be of a type disclosed and claimed in the aforenoted U.S. Patent No. 3,289,193. A similar cross channel monitor 58 having a grounded input conductor 59 may be connected by electrical conductors 60B and 60C across the output conductors 30B and 30C, while a third and similar cross channel monitor 62 having a grounded input conductor 63 may be connected by electrical conductors 64A and 64C across the output conductors 30A and 30C. The redundant systems 10, 12 and 14, heretofore described, may then be substantially the same as the cross channel monitored redundant systems disclosed in the aforenoted U.S. Patent No. 3,289,193.

SLAVING FEEDBACK LOOPS

A feature of the invention, as shown in FIGURE 1, is the provision of similar slaving feedback loops 75A, 75B and 75C for the respective channels 10, 12 and 14 of the redundant integrator systems of FIGURE 1. The slaving feedback loop 75A includes a differential amplifier 77A which may be of a conventional type or of a type such as disclosed in the aforementioned U.S. Patent No. 3,289,193, and includes input conductors 79A and 81A leading respectively from the integrator output conductor 30A and the output conductor 50A from the voter device 32A.

The differential amplifier 77A is arranged to sense the difference in the voltage of the voting circuit output applied through conductor 81A and the voltage of the integrator output applied through conductor 79A and apply the difference in said voltages as a control signal $ea_1$ to the input of a threshold level detector 87A which may be of a conventional type or of a type such as disclosed and claimed in the aforenoted U.S. Patent No. 3,311,837. The threshold level detector 87A provides an appropriate slaving feedback signal $e_{f1}$ to the summation device 24A upon the difference signal $e_{a1}$ exceeding a predetermined voltage level in one sense or the other.

Thus the threshold level detector 87A is so arranged that upon the signal $e_1$ being of an amplitude exceeding by a predetermined value that of the signal $e_{01}$ corresponding to the selected intermediate amplitude signal at the output of the voter device 32A, the resultant difference signal $e_{a1}$ causes the threshold level detector 87A to apply a follow up signal $e_{f1}$ of a polarity opposite to that of the controlling signal $e_{s1}$ applied at the conductor 30A so that the algebraic summation signal applied at conductor 26A is decreased in amplitude so as to bring the signal $e_1$ applied at conductor 30A into close correspondence with that of the selected intermediate amplitude signal $e_{01}$ applied at conductor 50A.

Further, upon the signal $e_1$ being of an amplitude less by a predetermined value than that of the signal $e_{01}$ there is applied then by the difference amplifier 77A a controlling signal $e_{a1}$ of an opposite polarity which causes the threshold level detector 87A to then apply a follow up signal $e_{f1}$ of a like polarity to that of the controlling signal $e_{s1}$ so that the algebraic summation signal is increased in amplitude so as to bring the signal $e_1$ applied at conductor 30A into close correspondence with the selected intermediate amplitude signal $e_{01}$ applied at conductor 50A.

The differential amplifier 77A has a grounded input output conductor 83A and an output conductor 85A leading to the input of the threshold detector 87A which in turn has a grounded input output conductor 89A. The threshold detector 87A may be of a conventional type or of a type such as disclosed and claimed in the aforenoted U.S. Patent No. 3,311,837, and has an output conductor 91A which leads to the summing device 24A, of conventional type, operably connected between the output conductor 20A leading from the signal source 18A and the input conductor 26A leading to the input of the integrator network 16A.

The slaving feedback loops 75B and 75C have like parts to those of the slaving feedback loop 75A and which like parts have been indicated by corresponding numerals bearing the suffixes B and C, respectively.

OPERATION

In the operation of the slaving feedback loops 75A, 75B and 75C, it should be borne in mind that the system shown in FIGURE 1 embodies a triple redundant system with three independent, but normally equal, input signals $e_{s1}$, $e_{s2}$, $e_{s3}$. It is required that the three output voltages $e_{01}$, $e_{02}$, $e_{03}$ be normally equal to the time-integrals of their respective input voltages $e_{s1}$, $e_{s2}$ and $e_{s3}$.

In order that the system be fail-operative for a first failure, the three voter devices or intermediate-amplitude selective gates 32A, 32B and 32C are inserted between the integrator network outputs, $e_1$, $e_2$ and $e_3$ and the system outputs. The outputs of the integrator networks 16A, 16B and 16C are cross-fed to the voters 32A, 32B and 32C, as described in the aforenoted copending U.S. applications. The integrator outputs are monitored two-by-two by cross-channel monitors 56, 58 and 62.

The key elements in the slaving feedback loops 75A, 75B and 75C are the respective differential amplifiers 77A, 77B and 77C and the threshold circuits 87A, 87B and 87C in the feedback loops shown in FIGURE 1. First, the system may be considered without the differential amplifiers and threshold circuits. In this situation, we have three independent open-loop integrators, each having a transfer function of the form —K/S. Assuming that the integrators are all zeroed initially, and the time history of each integrator output, $e_j$, is of the form:

$$e_j(t) = \int_0^t [K_j e_{sj}(t) + K_j \epsilon_j(t)] dt \quad (1)$$

where $K_j$ is the integrator gain in volts/sec. per volt
$e_{sj}$ is the integrator input voltage
$\epsilon_j$ is the integrator offset referred to the input and Then the difference between two integrator outputs, say $e_1$ and $e_2$, at time $t$ is given by:

$$e_2(t) - e_1(t) = \int_0^t \{K_2[e_{s2}(t) + \epsilon_2(t)] - K_1[e_{s1}(t) + \epsilon_1(t)]\} dt \quad (2)$$

Except for the trivial cases where the integrand in Equation 2 is identically zero or symmetrically periodic, the differential output of Equation 2 will increase with time until the threshold of monitor 56 is exceeded. This constitutes a nuisance alarm, since all components are assumed to have been operating within their allowable tolerances.

Now let us consider the effect of the slaving feedback loops 75A, 75B and 75C shown in FIGURE 1. The voters 32A, 32B and 32C maintain all system outputs at the intermediate amplitude among the integrator outputs, $e_1$, $e_2$, $e_3$. Suppose that the signal $e_2$ is intermediate and therefore applied as signal $e_{01}$, at output conductor 50A, then there exists a differential voltage, $\Delta e$, between the input conductors 79A and 81A leading to the differential amplifier 77A equal to $e_1-e_2$ upon signal $e_1$ being of a greater amplitude.

Figure 3:
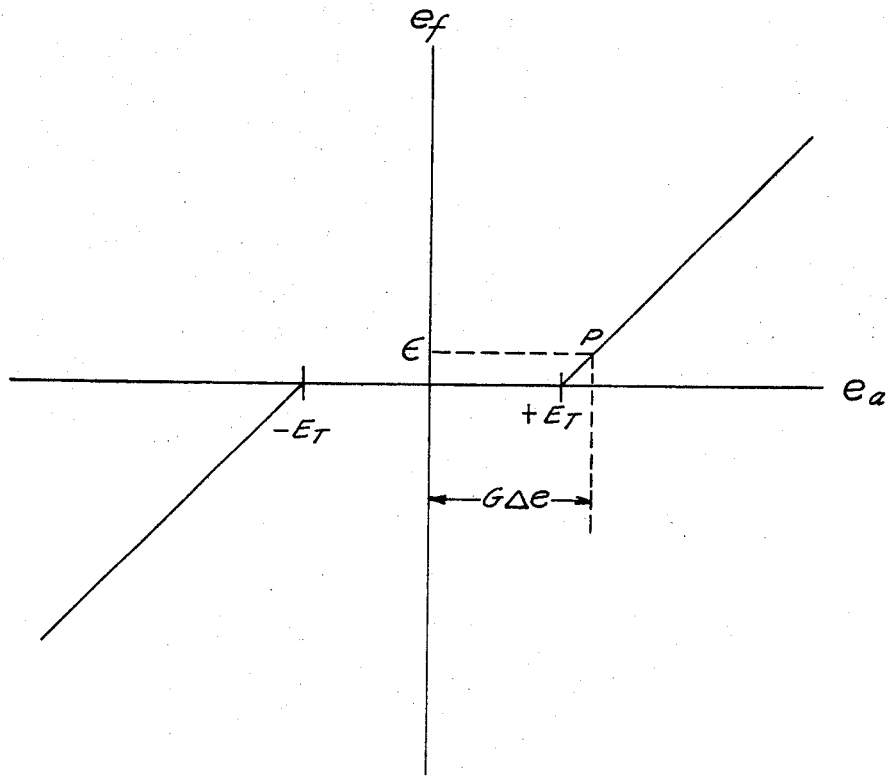
FIGURE 3 is a graphical illustration of the threshold characteristic of the threshold circuit in the slaving feedback circuit for each of the redundant integrator systems embodying the present invention.

The threshold circuits 87A, 87B and 87C are so arranged as to have the characteristic shown graphically in FIGURE 3, where $E_T$ is the nominal threshold setting and G is the gain of a given differential amplifier 77. If we now assume a condition where all inputs are zero, the $e_1$ will track $e_2$ such that $$G_1 \Delta e = E_T + \epsilon_1 \pm \epsilon_2$$

or $$\Delta e = \frac{E_T + \epsilon_1 \pm \epsilon_2}{G_1} \quad (3)$$

The $\epsilon_2$ term arises from the contribution of integrator 16B output drift which integrator 16A must track. If the offset contributions are small compared with the threshold $E_T$, then $\Delta e$ is approximately $E_T/G_1$ with $G_1$ corresponding to the gain of the differential amplifier 77A.

This level can be made as small as desired compared with the threshold level of the monitor 56, 58 and 62 by increasing $G_1$. The threshold itself, $E_T$, cannot be decreased without limit, however, since the feedback path around the voter 32A, 32B or 32C constitutes a positive feedback. Should the gain of the positive feedback exceed the negative feedback slightly because of circuit tolerances, the loop would become statically unstable and result in a divergent output. The threshold effectively makes the positive feedback gain zero for the on-line integrator network 16A, 16B or 16C which is operating near the center of the threshold band.

However, the inputs to those integrator networks 16A, 16B or 16C which are operating at one side or the other of the center of the threshold bank is effectively increased or decreased in amplitude as the case may be so as to bring the signals at the outputs of such integrator networks into close correspondence with the amplitude of the selected intermediate amplitude signal.

Figure 2:
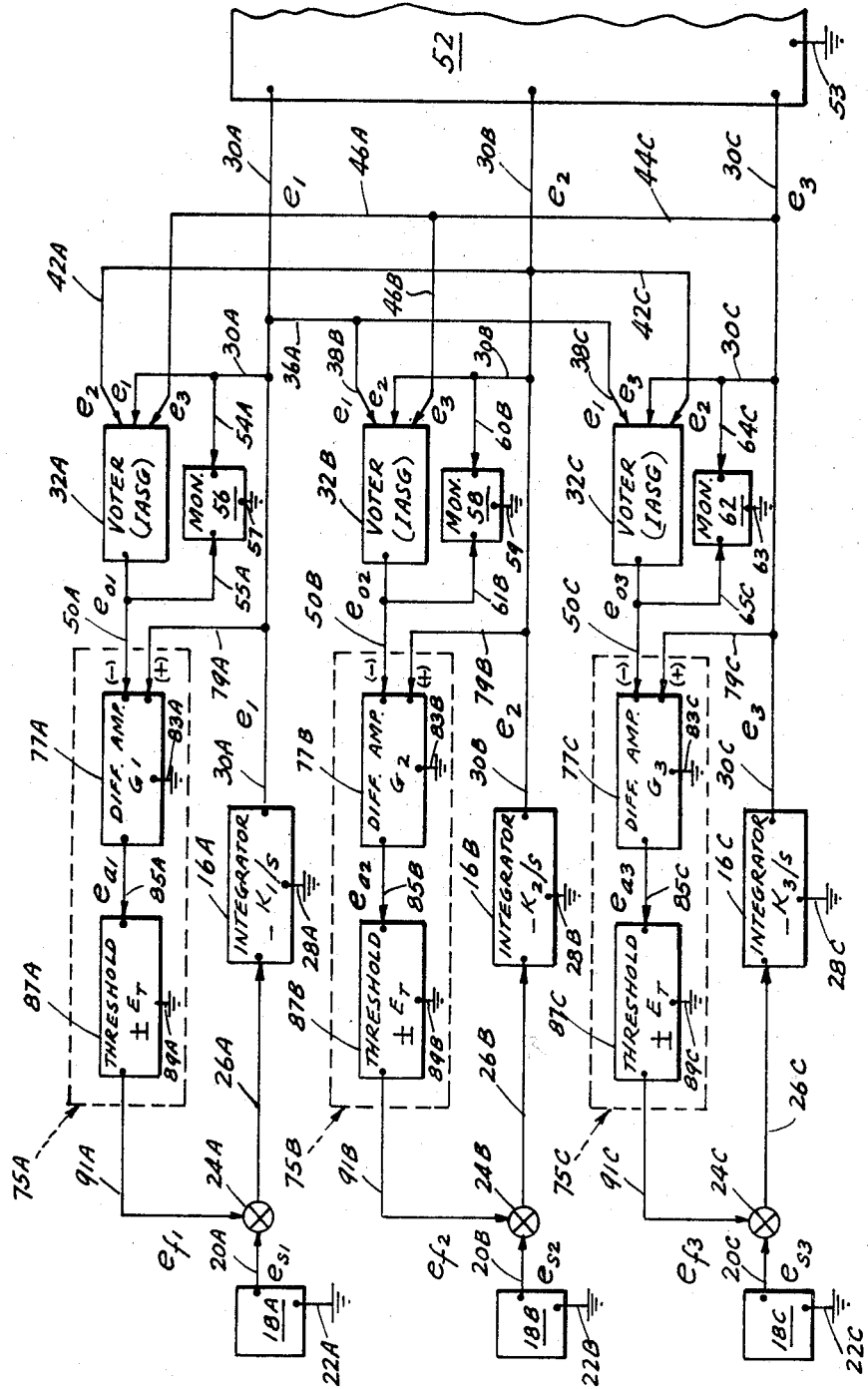
FIGURE 2 is a block diagram of a triple redundant integrator system embodying the present invention and including off-line voting devices and cross-voter monitors.

Several variations of the configuration shown in FIGURE 1 are possible. It may be desirable in certain cases to maintain the in-line voters 32A, 32B and 32C at the integrator outputs to reduce discrepancies between the three channel output signals. However, the integrator voters 32A, 32B and 32C may be placed off-line, as shown by FIGURE 2, in which redundant system like parts to those described with reference to FIGURE 1 have been indicated by corresponding numerals, and in which output lines 30A, 30B and 30C leading from the integrator networks 16A, 16B and 16C, respectively, may be connected directly to inputs of the device or devices 52 operated thereby. The monitors 56, 58 and 62 may also be applied by conductors 54A and 55A; 60B and 61B; and 64C and 65C, respectively, in a cross-voter manner, shown in FIGURE 2, rather than in the cross-channel manner of FIGURE 1. The relative merits of these respective monitor arrangements have been discussed in the aforenoted U.S. Patents Nos. 3,305,735 and 3,289,193 and copending U.S. application Ser. No. 317,970.

It will be seen from the foregoing that the following features and novel aspects are provided in the present invention:

(1) There has been described novel slaving feedback loops 75A, 75B and 75C so arranged in relation to the triple redundant systems that there may be incorporated signal integration with respect to time in triple redundant computing and control systems. Heretofore, because of variations in the offsets, gains and drifts associated with realizable (as opposed to ideal) integrators, such integration has not been applicable to redundant systems.

(2) There has also been incorporated in such triple-redundant systems, as shown by FIGURE 2, intermediate-amplitude selective gates or voters 32A, 32B and 32C for signal selection so arranged that any signal failure does not propagate to the output terminals.

(3) Through the provision of the voters 32A, 32B and 32C only the intermediate-amplitude signal is transmitted to all output terminals, whereas the outputs of the other integrators are slaved automatically through the action of the slaving feedback loops 75A, 75B and 75C to within close correspondence to the intermediate amplitude signal so as to prevent operation of the monitoring means 56, 58 and 62 within a predetermined normal operating range.

(4) Moreover, through the arrangement of the present invention any single integrator slaving loop failure will be detected by the monitors 56, 58 and 62 associated with the output voters 32A, 32B and 32C.

Although two embodiments of the invention have been illustrated and described, various changes in the form and relative arrangement of the parts, which will now appear to those skilled in the art may be made without departing from the scope of the invention. Reference is, therefore, to be had in the appended claims for definition of the limits of the invention.

What is claimed is:

1. A redundant system which comprises a plurality of signal channels, each signal channel including:
   means for applying a controlling signal,
   an integrator having a signal input and a signal output,
   means for connecting the controlling signal to the signal input of the integrator,
   means for selecting an intermediate amplitude signal from among the signal outputs of each of said integrators,
   means responsive to a difference in amplitude between the output of the integrator of the corresponding signal channel and the selected intermediate amplitude signal effected at the output of the integrator of one of the signal channels for applying a feedback signal upon said difference in amplitude exceeding a predetermined value,
   and said connecting means including means for algebraically summing the feedback signal with the controlling signal to effect a summation signal applied to the input of the corresponding integrator to maintain the output of said corresponding integrator in close correspondence to the selected intermediate amplitude signal effected at the output of the integrator of said one selected signal channel.

2. The redundant system defined by claim 1 including:
   means for monitoring the signal output from each integrator in response to a difference between output signals of said channels and the selected intermediate amplitude signal,
   and the outputs of said integrators being maintained in close correspondence to the selected intermediate amplitude signal so as to prevent operation of the monitoring means upon differences in the signal outputs of the integrators within a predetermined normal operating range.

3. A redundant system which comprises:
   a plurality of signal channels, each signal channel including:
      means for applying a controlling signal, an integrator having a signal input and a signal output,
      means for connecting the controlling signal to the signal input of the integrator,
      a voter device for selecting an intermediate amplitude signal from among the signal outputs of each of said integrators,
      a first means responsive to the selected intermediate amplitude signal effected at the output of the integrator of one of the signal channels,
      second means controlled by the first means for applying a feedback signal,
      and said connecting means including means for algebraically summing the feedback signal with the controlling signal to effect a summation signal applied to the input of the corresponding integrator so as to maintain the output of said corresponding integrator in close correspondence to the selected intermediate amplitude signal effected at the output of the integrator of said one selected signal channel.

4. The redundant system defined by claim 3 in which the first means of each signal channel includes a differential amplifier responsive to a difference in amplitude between the output of the integrator of the corresponding signal channel and the selected intermediate amplitude signal effected at the output of the integrator of said one selected signal channel to effect a controlling signal for said second means upon said difference in amplitude exceeding a predetermined value.

5. The redundant system defined by claim 4 in which the second means includes a threshold level detector means responsive to the controlling signal from the differential amplifier for applying the feedback signal to the summing means in a sense to maintain the output of said corresponding integrator in close correspondence to the selected intermediate amplitude signal effected at the output of the integrator of said one selected signal channel.

6. The redundant system defined by claim 3 including:
   means for monitoring the signal output from each integrator output in response to a difference between output signals of said channels and the selected intermediate amplitude signal,
   and the outputs of said integrators being maintained in close correspondence to the selected intermediate amplitude signal so as to prevent operation of a monitoring means upon differences in the signal outputs of the integrators being within a predetermined normal operating range.

7. A redundant system which comprises a plurality of electrical signal channels, each signal channel including:
   means for applying a controlling electrical signal,
   an electrical integrator network having an electrical signal input and an electrical signal output,
   means for connecting the controlling electrical signal to the signal input of the integrator network,
   means for selecting an intermediate amplitude signal from among the electrical signal outputs of each of said integrator networks,
   and means for sensing an electrical difference in amplitude between the electrical signal output of the integrator network of the corresponding signal channel and the selected intermediate amplitude signal effected at the electrical output of the integrator network of one of said signal channels,
   said electrical difference sensing means applying an electrical feedback signal upon said difference in amplitude exceeding a predetermined threshold value and said electrical feedback signal being of a sense dependent upon which of said sensed signals be of a greater amplitude,
   and said connecting means including means for algebraically summing the electrical feedback signal with the controlling signal to effect a summation signal applied to the input of the corresponding integrator network in a sense to maintain the output of said corresponding integrator network in close correspondence to the selected intermediate amplitude signal effected at the output of the integrator network of said one selected signal channel.

8. The redundant system defined by claim 7 including:
   means for monitoring the signal output from each integrator network in response to a difference between output signals of said channels and the selected intermediate amplitude signal,
   and the outputs of said integrator networks being maintained in close correspondence to the selected intermediate amplitude signal so as to prevent operation of the monitoring means upon differences in the signal outputs of the integrator networks being within a predetermined normal operating range.

9. A redundant system which comprises:

a plurality of electrical signal channels, each signal channel including, means for applying a controlling electrical signal, an electrical integrator network having an electrical signal input and an electrical signal output, means for connecting the controlling electrical signal to the electrical signal input of the electrical integrator network, a voter device for selecting an intermediate amplitude signal from among the electrical signal outputs of each of said integrator networks, a differential amplifier means for sensing a difference in amplitude between the electrical signal output of the integrator network of the corresponding signal channel and the selected intermediate amplitude of the electrical signal effected at the output of the integrator network of one of said signal channels to effect a differential signal, a threshold level detector means responsive upon the differential signal exceeding a predetermined threshold value to apply an electrical feedback signal of a sense dependent upon which of the sensed signals be of a greater amplitude, and said connecting means including means for algebraically summing the electrical feedback signal with the controlling signal to effect a summation signal at the input of the corresponding integrator network effective in a sense to maintain the output of said corresponding integrator network in close correspondence to the selected intermediate amplitude signal effected at the output of the integrator network of said one selected signal channel.

10. The redundant system defined by claim 9, including:

means for monitoring the signal output from each integrator network in reference to outputs of other of said integrator networks, and the electrical outputs of said electrical integrator networks being maintained at an amplitude in correspondence to the selected intermediate amplitude signal so as to prevent operation of the monitoring means upon the monitored signal and reference outputs differing within a predetermined normal operating range.

References Cited
UNITED STATES PATENTS

| | | | |
|---|---|---|---|
| 3,047,843 | 7/1962 | Katz | 340—213 |
| 3,098,219 | 7/1963 | Voigt | 340—213 |

THOMAS B. HABECKER, Primary Examiner

U.S. Cl. X.R.

340—172.5